United States Patent
Chen et al.

(10) Patent No.: US 7,916,589 B2
(45) Date of Patent: Mar. 29, 2011

(54) CONTROL METHOD OF OPTICAL DISC DRIVE

(75) Inventors: Yung-Hsiang Chen, Taoyuan County (TW); Shiu-Ming Chu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 430 days.

(21) Appl. No.: 12/128,605

(22) Filed: May 28, 2008

(65) Prior Publication Data

US 2009/0080299 A1    Mar. 26, 2009

(30) Foreign Application Priority Data

Sep. 21, 2007   (TW) ............................... 96135834 A

(51) Int. Cl.
    *G11B 27/10*    (2006.01)
(52) U.S. Cl. .................................. 369/47.33
(58) Field of Classification Search .................. None
    See application file for complete search history.

(56) References Cited

U.S. PATENT DOCUMENTS

| 5,749,086 A * | 5/1998 | Ryan ............................. 711/105 |
| 6,373,793 B1 * | 4/2002 | Sasaki et al. .................. 369/30.1 |
| 6,430,127 B1 * | 8/2002 | Tsukihashi ................ 369/47.33 |
| 6,574,642 B1 * | 6/2003 | James .................................... 1/1 |
| 7,206,269 B2 * | 4/2007 | Sakai et al. .................. 369/47.4 |
| 7,613,867 B2 * | 11/2009 | Sasaki ........................... 711/100 |
| 2002/0012297 A1 * | 1/2002 | Suzuki ........................ 369/47.3 |
| 2003/0223332 A1 * | 12/2003 | Fukuda ..................... 369/47.33 |
| 2004/0057366 A1 * | 3/2004 | Sasaki ........................ 369/53.37 |
| 2006/0123191 A1 * | 6/2006 | Hayasaka ..................... 711/113 |

OTHER PUBLICATIONS

Machine translation of Hashimoto, JP 2001-043683, published Feb. 16, 2001.*

* cited by examiner

*Primary Examiner* — Peter Vincent Agustin

(74) *Attorney, Agent, or Firm* — Winston Hsu; Scott Margo

(57) ABSTRACT

The present invention provides a control method of an optical disc drive, including the steps of: (a) entering a writing state; (b) checking if a reading command for requesting recorded data is received, wherein when the reading command is not received, then continuing a writing process, and when the reading command is received, then going to step (c); (c) interrupting the writing process; (d) switching to a reading state; (e) reading the recorded data according to the reading command; and (f) switching to the writing state.

9 Claims, 3 Drawing Sheets

CONTROL METHOD OF OPTICAL DISC DRIVE

BACKGROUND OF THE INVENTION

1. Field of the Invention

The present invention relates to controlling an optical disc drive, and more particularly, to a method of switching the optical disc drive into a reading state from a writing state in order to read recorded data on an optical disc.

2. Description of the Prior Art

A rewritable optical disc, such as CD+RW(R)/-RW(R) and DVD+RW/-RW, which has the properties of large storage capacity, low price, and easy portability, has been commonly used by users as a storage medium for video data for a long time.

Please refer to FIG. 1. FIG. 1 is a flowchart illustrating a prior art reading procedure of an optical disc drive after the optical disc drive receives a reading command from a host computer when the optical disc drive is under a writing state. According to the prior art, when the optical disc drive receives a writing command from the host computer, the optical disc drive enters the writing state in step P1, and then starts writing data onto a rewritable optical disc. At the same time, i.e. in the writing process, the optical disc drive will check if there is any reading command received from the host computer for reading the recorded data on the optical disc (step P2). If it is detected that a reading command was received from the host computer, then, in step P3, the optical disc drive will send an error code (such as Senskey02/04/08) back to the host computer. (Please note that, some of the prior art may abort the whole writing process when the reading command is received from the host computer.) Then, in step P4, the optical disc drive continues to proceed with the writing process. Accordingly, once the prior art optical disc drive enters the writing state, the optical disc drive will write the predetermined data onto the optical disc continuously until the predetermined data is completely recorded onto the optical disc. In other words, the recorded data can only be read by the optical disc drive after the whole data writing process is finished.

As the optical disc drive may need a long time to write the whole data onto the rewritable optical disc and the user is unable to obtain the previously recorded data during the data writing process, the user has to wait for the optical disc drive to finish the data writing process before instructing the optical disc drive to read the recorded data on the optical disc. Accordingly, the conventional control method of the optical disc drive is inefficient and inconvenient for one who needs to review the recorded data instantaneously. Therefore, there is a need to improve the conventional control method of the optical disc drive.

SUMMARY OF THE INVENTION

One of the objectives of the present invention is to provide a control method for switching the optical disc drive into a reading state from a writing state in order to read recorded data in response to a command from the host computer, and then switch the optical disc drive into the writing state from the reading state to resume the original writing process, thereby allowing instant review of the recorded data.

According to an embodiment of the present invention, a control method of an optical disc drive is disclosed. The control method includes the steps of: (a) entering a writing state; (b) checking if a reading command for requesting recorded data is received, wherein if the reading command is not received, then continuing a writing process, and if the reading command is received, then going to step (c); (c) interrupting a writing process; (d) switching to a reading state; (e) reading the recorded data according to the reading command; and (f) switching to the writing state.

These and other objectives of the present invention will no doubt become obvious to those of ordinary skill in the art after reading the following detailed description of the preferred embodiment that is illustrated in the various figures and drawings.

DETAILED DESCRIPTION

For a more complete understanding of the present invention, and the advantages thereof, reference is now made to the following descriptions taken in conjunction with the accompanying drawings.

The control method (reading/writing method) of the optical disc driver according to a first exemplary embodiment of the present invention is to interrupt an ongoing writing process when the optical disc drive under the writing state receives a reading command from a host computer externally connected to the optical disc drive. Though the host computer will stop sending data to be recorded to the optical disc drive once the host computer sends the reading command to the optical disc drive, there are some data remaining in a buffer memory of the optical disc drive that are waiting to be written onto an optical disc when the optical disc drive is under the writing state. The data remaining in the buffer should be handled first to avoid loss of the data that are not yet recorded onto the optical disc.

Therefore, once the optical disc drive of the present invention needs to interrupt the ongoing writing process, the data remaining in the buffer will be continuously written onto the optical disc, until all of the data remaining in the buffer have been recorded onto the optical disc. Then, a breaking point is formed, which indicates that the "buffer under run" occurs. Then, the optical disc drive forms a breaking mark right after the breaking point, such as a modulation mark with time length of 3-11T, and stores the related recording parameter, such as the address of the recording mark, into a memory. Afterward, the optical disc drive switches from the writing state into the reading state to read the recorded data on the optical disc. When the reading process is finished, the optical disc drive needs to switch back to the writing state to continue the writing process. Accordingly, the related recording parameter stored in the memory is then utilized by the optical disc drive to locate the breaking mark on the optical disc efficiency. Once the breaking mark is found, the optical disc drive can resume the writing process for writing the data at a correct position of the optical disc, thereby maintaining the integrity of the recorded data on the optical disc.

Figure 1:
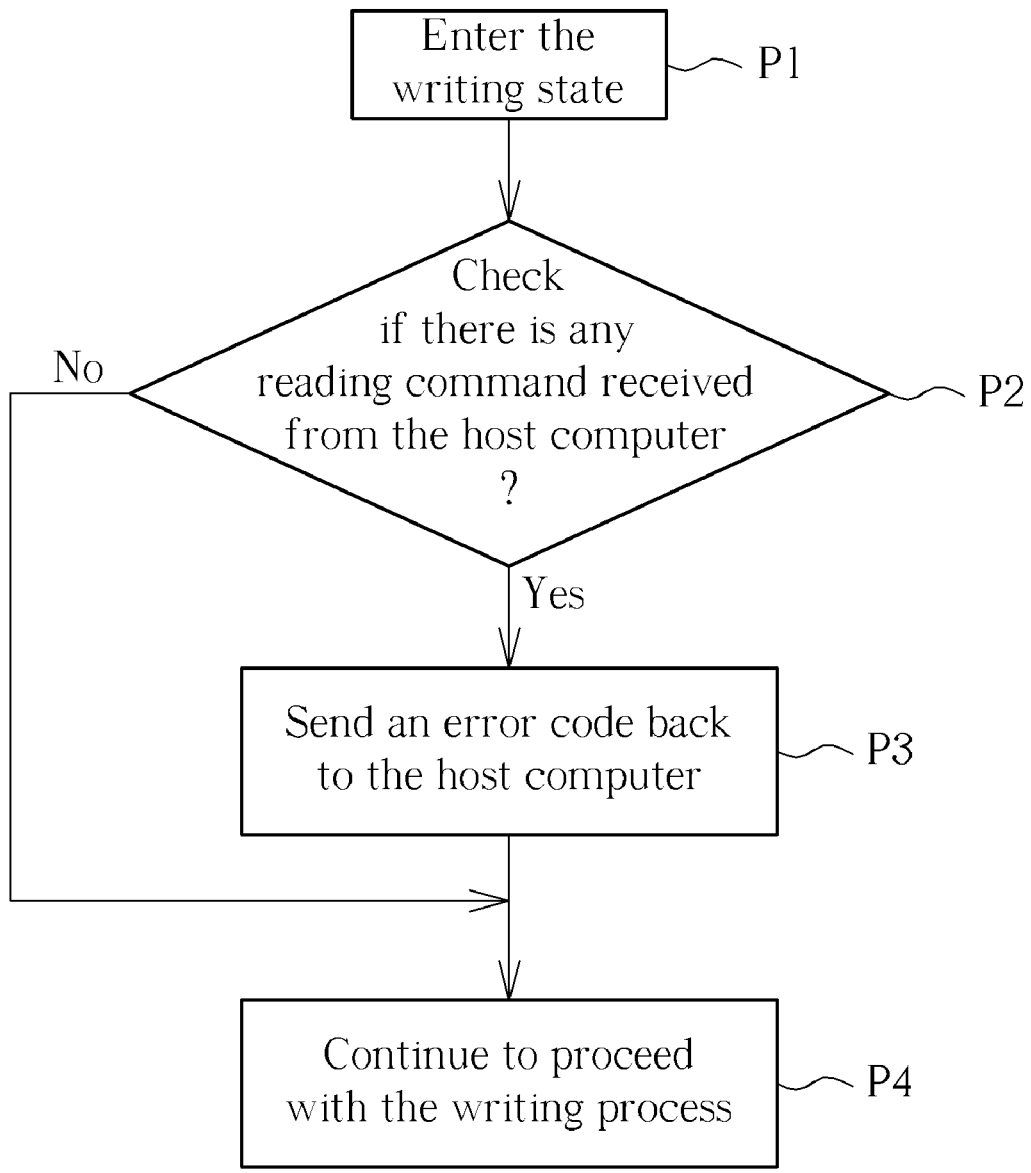
FIG. 1 is a flowchart illustrating a prior art reading procedure of an optical disc drive under a writing state after the optical disc drive receives a reading command from a host computer.
Figure 2:
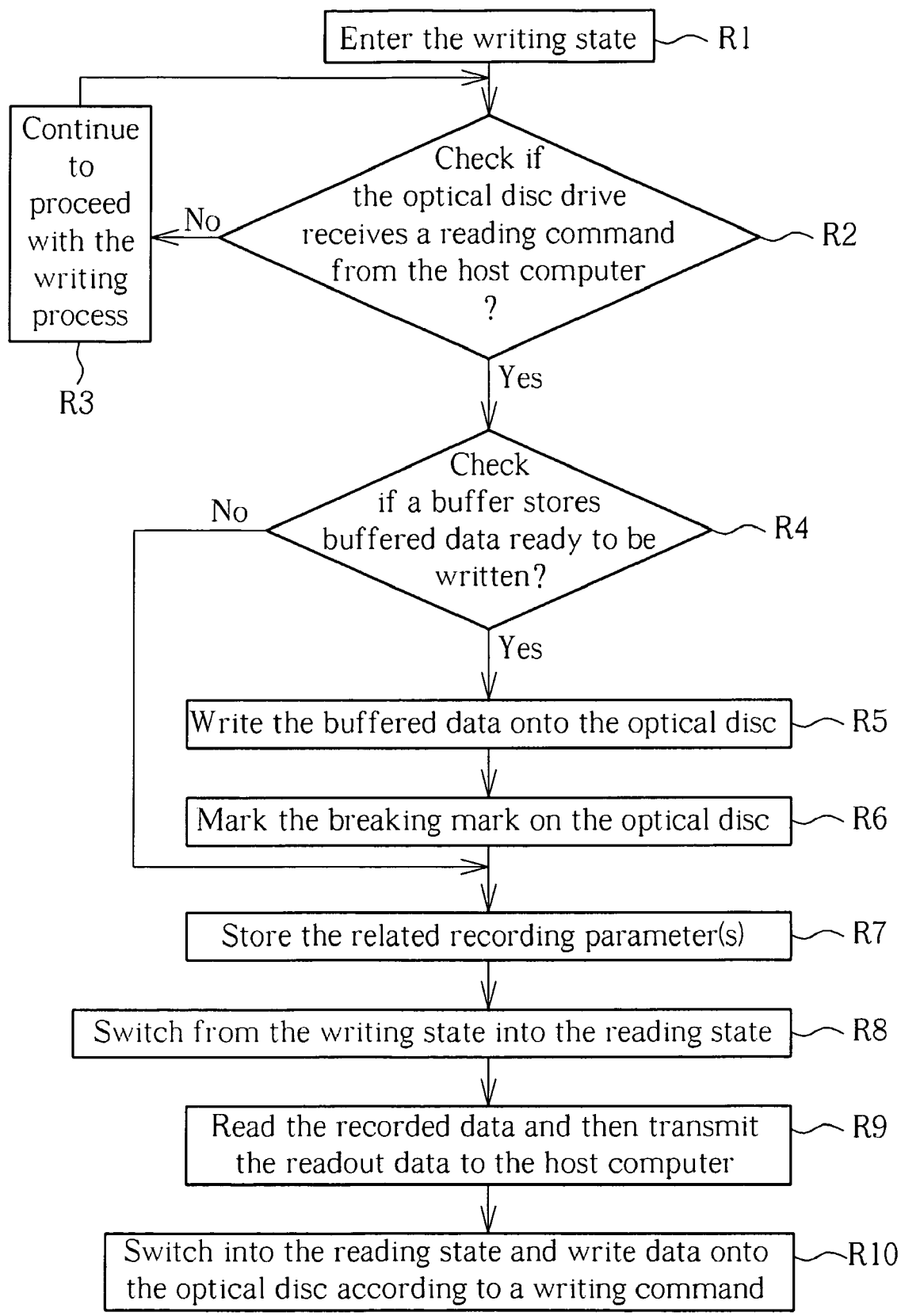
FIG. 2 is a flowchart illustrating a control method of an optical disc drive accessing an optical disc according to a first embodiment of the present invention.

Please refer to FIG. 2. FIG. 2 is a flowchart illustrating the control method of the optical disc drive accessing (read/write) the optical disc according to a first embodiment of the present invention. The control method is detailed as follows. First of all, the control method controls the optical disc drive to enter the writing state in step R1. Then, in step R2, the control method checks if the optical disc drive receives a reading command from the host computer, in which the reading command requests the optical disc drive to read the recorded data on the optical disc. If there is no reading command received, the flow goes to step R3 to continue proceeding with the writing process, and then goes to step R2 to keep checking if the optical disc drive receives the reading command from the host computer. If the reading command was received in step R2, then the flow goes to step R4 to check if a buffer in the optical disc drive stores buffered data ready to be written onto the optical disc. If there are buffered data waiting to be written onto the optical disc, then the flow goes to step R5 to write the buffered data onto the optical disc, until there is no buffered data remaining in the buffer. This indicates that the "buffer under run" occurs. Then, the flow proceeds with step R6 for marking the breaking mark on the optical disc to serve as a continuation mark for resuming the writing process. Then, the flow goes to step R7 for storing the related recording parameter(s) into the memory to complete the writing interrupt process. Furthermore, if step R4 determines that there is no buffered data waiting to be written onto the optical disc, then the flow goes to step R7 directly to store the related recording parameter(s) into the memory to complete the writing interrupt process.

When the writing interrupt process is completed, the flow goes to step R8. In step R8, the optical disc drive is switched from the writing state into the reading state. Then, the flow goes to step R9 for reading the recorded data on the optical disc according to the reading command from the host computer, and then transmitting the readout data to the host computer. The user can then review and check the recorded data read from the optical disc through the host computer. Then, the flow goes to step R10 for switching the optical disc drive from the writing state into the reading state. In step R10, the optical disc drive writes data onto the optical disc according to a writing command from the host computer, and at the same time, the optical disc drive keeps monitoring the receipt of any incoming reading command for requesting the recorded data on the optical disc (step R2).

Therefore, according to the novel control method of the optical disc drive accessing the optical disc, when the optical disc drive in the writing state receives a reading command issued from the host computer, the optical disc drive first writes all of the data currently remaining in the buffer onto the optical disc to keep the integrity of the recorded data, and then interrupts the writing process and enters the reading state for reading the recorded data on the optical disc. In other words, the user can review the recorded data stored on the optical disc instantly and does not need to wait for the completion of the whole writing process. Furthermore, when the reading process of the requested data on the optical disc is finished, the optical disc drive switches back to the writing state to resume the writing process using the related recording parameter(s) stored in the memory and the continuation mark of the breaking point. In this way, the optical disc drive can continue the data writing to thereby keep the integrity of the recorded data.

Figure 3:
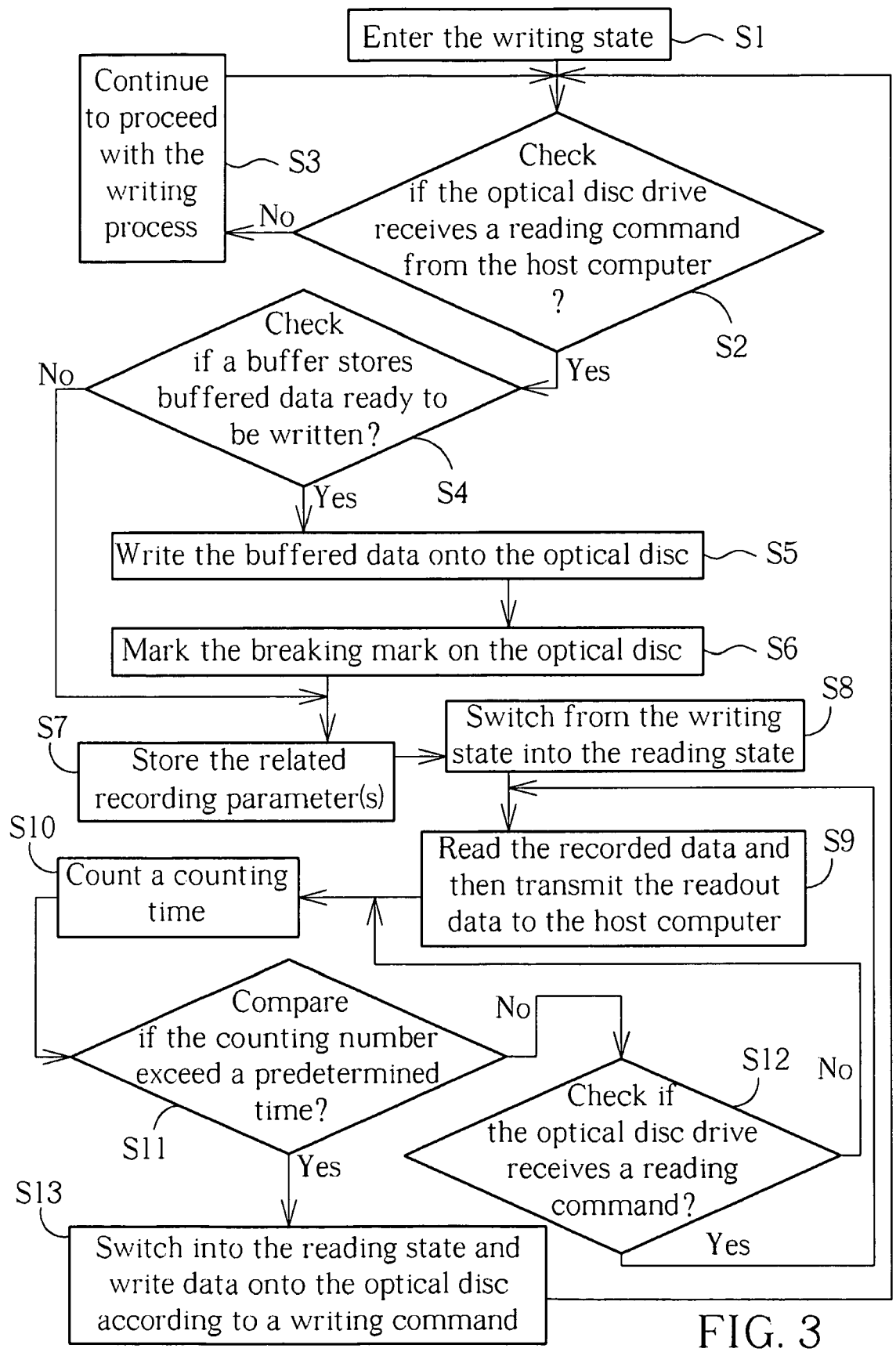
FIG. 3 is a flowchart illustrating a control method of an optical disc drive accessing an optical disc according to a second embodiment of the present invention.

Please refer to FIG. 3. FIG. 3 is a flowchart illustrating the control method of the optical disc drive accessing the optical disc according to a second embodiment of the present invention. According to the first embodiment of the present invention, after the reading command from the host computer is accomplished, the optical disc drive will switch into the writing state to continue the writing process automatically. If the user wants to review some other recorded data stored on the optical disc, however, then the host computer needs to re-send a reading command to the optical disc drive to switch it into the reading state from the writing state. In other words, the user may waste a long time if the state switching happens frequently due to frequent user review of the recorded data on the optical disc. Therefore, in order to avoid the frequent switching between the reading state and the writing state, which degrades the performance of the optical disc drive, the second embodiment of the present invention delays a predetermined time before switching the optical disc drive back to the writing state when the reading process of the recorded data is accomplished. According to the second embodiment, the user can review the recorded data read out from the optical disc within the predetermined time to avoid the unnecessary switching between the reading state and the writing state.

The control method according to the second embodiment of the present invention is described in the following description. First of all, the control method controls the optical disc drive to enter the writing state in step S1. Then, in step S2, the control method checks if the optical disc drive receives a reading command, in which the reading command is to request the optical disc drive to read the recorded data on the optical disc. In step S3, the control method continues the writing process. In step S4, the control method checks if there is any data buffered in the buffer. In step S5, the control method writes the data buffered in the buffer onto the optical disc. In step S6, the control method marks the breaking mark on the optical disc. In step S7, the control method stores the related recording parameter(s) into the memory. In step S8, the control method switches the optical disc drive into the reading state. In step S9, the control method reads the recorded data and transmits the readout data to the host computer. Therefore, the steps S1 to S9 are, respectively, substantially similar to the steps R1 to R9 of the first embodiment.

The difference between the first embodiment and the second embodiment is described as below. When step S9 is accomplished, the flow then goes to step S10 for counting a counting time, and does not switch the optical disc drive to the writing state. Then, in step S11, the control method compares the counting time with a predetermined time. If the counting time does not exceed the predetermined time, the flow then goes to step S12 to check if the optical disc drive receives a reading command from the host computer. If the reading command for requesting recorded data on the optical disc is not received, the flow then goes back to step S10 for continuing the counting operation. If the reading command is received, the flow then goes to step S9 to read the recorded data on the optical disc according to the reading command issued from the host computer, and to transmit the readout data to the host computer. If the counting time exceeds the predetermined time in step S11, the flow then goes to step S13 to switch the optical disc drive into the writing state from the reading state to wait for the writing command from the host computer, and at the same time, the optical disc drive keeps monitoring the receipt of any reading command (step S2).

Accordingly, the second embodiment of the present invention can remain in the reading state for the predetermined time after reading out the recorded data on the optical disc that are requested by the reading command to thereby avoid the frequent switching between the reading state and the writing state. In this way, the total waiting time of the reading process is reduced, resulting in improved performance of the optical disc drive.

Those skilled in the art will readily observe that numerous modifications and alterations of the device and method may be made while retaining the teachings of the invention.

What is claimed is:

1. A control method of an optical disc drive, comprising:
   (a) entering a writing state;
   (b) checking if a reading command for requesting recorded data is received, wherein when the reading command is not received, continuing a writing process, and when the reading command is received, going to step (c);
   (c) interrupting the writing process, comprising:
      (c1) checking if a buffer of the optical disc drive has data waiting to be written onto an optical disc, if yes, going to step (c2); if no, going to step (c4);
      (c2) writing the data stored in the buffer onto the optical disc;
      (c3) marking a breaking mark on the optical disc; and
      (c4) storing related recording parameter(s);
   (d) switching to a reading state;
   (e) reading the recorded data according to the reading command; and
   (f) switching to the writing state.

2. The control method of claim 1, wherein the step (c2) comprises continuously writing the data stored in the buffer onto the optical disc until all of the data stored in the buffer have been recorded onto the optical disc, thereby forming a breaking point.

3. The control method of claim 2, wherein the step (c3) comprises marking a breaking mark right after the breaking point.

4. The control method of claim 3, wherein the breaking mark comprises a modulation mark with a time length of 3-11T.

5. The control method of claim 1, wherein the optical disc drive is further coupled to a host computer, and the host computer issues the reading command in step (b).

6. The control method of claim 5, wherein the step (e) comprises reading the recorded data requested by the reading command and outputting the recorded data to the host computer.

7. The control method of claim 5, wherein the step (f) comprises proceeding with the step (b) to check if the reading command is received from the host computer.

8. The control method of claim 5, wherein after reading the recorded data according to the command in step (e), the control method further comprises:
   (e1) counting a counting time;
   (e2) comparing the counting time with a predetermined time, wherein when the counting time exceeds the predetermined time, going to step (f); and when the counting time does not exceed the predetermined time, going to step (e3); and
   (e3) checking if the reading command is received from the host computer, wherein when the reading command is not received, going to step (e1); and when the reading command is received, going to step (e) to read and output the recorded data according to the reading command.

9. The control method of claim 8, wherein the predetermined time is utilized for delaying a switching from the reading state into the writing state in order to give enough review time for the recorded data read out from the optical disc.

* * * * *